United States Patent
Qin et al.

(10) Patent No.: US 12,307,295 B1
(45) Date of Patent: May 20, 2025

(54) TASK SCHEDULING METHOD AND APPARATUS, ELECTRONIC DEVICE, AND STORAGE MEDIUM

(71) Applicant: SUZHOU METABRAIN INTELLIGENT TECHNOLOGY CO., LTD., Jiangsu (CN)

(72) Inventors: Wenzheng Qin, Jiangsu (CN); Ji Zhong, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/878,029

(22) PCT Filed: Jun. 20, 2023

(86) PCT No.: PCT/CN2023/101218
§ 371 (c)(1),
(2) Date: Dec. 21, 2024

(87) PCT Pub. No.: WO2024/119764
PCT Pub. Date: Jun. 13, 2024

(30) Foreign Application Priority Data

Dec. 6, 2022 (CN) .......................... 202211554104.8

(51) Int. Cl.
*G06F 9/50* (2006.01)
(52) U.S. Cl.
CPC .................................. *G06F 9/5027* (2013.01)
(58) Field of Classification Search
None
See application file for complete search history.

(56) References Cited

U.S. PATENT DOCUMENTS 8,327,379 B2 * 12/2012 Maruyama ............ G06F 9/4843
718/103
8,370,846 B2 * 2/2013 Hayashi ................ G06F 9/4887
718/107

(Continued)

FOREIGN PATENT DOCUMENTS

CN 101529383 A 9/2009
CN 111124624 A 5/2020

(Continued)

OTHER PUBLICATIONS

Jung et al.; "HIOS: A Host Interface I/O Scheduler for Solid State Disks"; 2014 IEEE; (Jung_2014.pdf; pp. 1-12) (Year: 2014).*

(Continued)

*Primary Examiner* — Hiren P Patel
(74) *Attorney, Agent, or Firm* — IPro, PLLC (57) ABSTRACT

The present disclosure discloses a task scheduling method and apparatus, an electronic device and a non-transitory computer readable storage medium. The method includes: creating a target task and creating a target process corresponding to the target task; selecting an idle target central processing unit (CPU) core for the target task and deploying the target process in the target CPU core; calling a process function in the target process using the target CPU core to execute the target task; in a process of executing the target task, calling a task switching function of the target task; and selecting a switching task from all tasks waiting for switching and calling a process function corresponding to the switching task using the target CPU core to switch the target CPU core to the switching task for execution.

18 Claims, 3 Drawing Sheets

(56) References Cited

U.S. PATENT DOCUMENTS

| | | | |
|---|---|---|---|
| 9,582,312 B1* | 2/2017 | Karppanen | G06F 11/3466 |
| 10,949,242 B2 | 3/2021 | Chen et al. | |
| 2008/0172667 A1* | 7/2008 | Inoue | G06F 9/54 |
| | | | 718/100 |
| 2009/0282407 A1* | 11/2009 | Hayashi | G06F 9/4881 |
| | | | 718/100 |
| 2011/0004883 A1* | 1/2011 | El-Moursy | G06F 9/4881 |
| | | | 718/103 |
| 2012/0174112 A1 | 7/2012 | Vaidya et al. | |
| 2013/0042251 A1* | 2/2013 | Nader | G06F 9/4881 |
| | | | 718/103 |
| 2014/0289725 A1* | 9/2014 | Velayutham | G06F 9/544 |
| | | | 718/1 |
| 2015/0370606 A1* | 12/2015 | Panferov | G06F 9/5038 |
| | | | 718/103 |
| 2016/0034190 A1* | 2/2016 | Lin | G06F 3/061 |
| | | | 711/103 |
| 2018/0039521 A1* | 2/2018 | White | G06F 9/54 |
| 2020/0334086 A1* | 10/2020 | Li | G06F 9/26 |
| 2021/0311789 A1* | 10/2021 | Jung | G06F 9/4812 |
| 2023/0229495 A1* | 7/2023 | Zhang | G06F 9/5038 |
| | | | 718/102 |

FOREIGN PATENT DOCUMENTS

| | | |
|---|---|---|
| CN | 111176815 A | 5/2020 |
| CN | 111367642 A | 7/2020 |
| CN | 113821311 A | 12/2021 |
| CN | 114138178 A | 3/2022 |
| CN | 114675951 A | 6/2022 |
| CN | 115658277 A | 1/2023 |

OTHER PUBLICATIONS

Lihua Xu, et al. "Analysis of Arm Cortex-M4 Based Task Context Switch Mechanism in MQX Scheduling." Computer Applications and Software. 32(7). Jul. 2015.

Altmann, Erik M., and Wayne D. Gray. "An integrated model of cognitive control in task switching." Psychological review 115.3 (2008): 602.

* cited by examiner

TASK SCHEDULING METHOD AND APPARATUS, ELECTRONIC DEVICE, AND STORAGE MEDIUM

CROSS-REFERENCE TO RELATED APPLICATION

The present disclosure claims the priority of Chinese patent application filed on Dec. 6, 2022 before the CNIPA, China National Intellectual Property Administration with the application number of 202211554104.8, and the title of "TASK SCHEDULING METHOD AND APPARATUS, ELECTRONIC DEVICE, AND STORAGE MEDIUM", which is incorporated herein in its entirety by reference.

FIELD

The present disclosure relates to the field of computer technologies, and more particularly to a task scheduling method and apparatus, an electronic device and a non-transitory computer readable storage medium.

BACKGROUND

A solid state disk (SSD) has advantages of high performance and low power consumption, and is a device configured to store user data. The SSD consists of modules such as a controller and a storage medium NAND (an NAND flash memory, a computer flash memory device). Firmware runs in the controller to perform operations such as controlling resources, storing and scheduling the user data, and maintaining an NAND device.

Under the current related art, there is no special purpose operating system for the SSD. The operating system should at least provide functions such as task scheduling, resource management and system calls. A general operating system is not designed for such high concurrency. If each process in the operating system serves a task, there will be thousands of processes. Although the operating system can nominally have so many processes, the efficiency of the switching and scheduling of the processes in the scenario is very low, which cannot meet requirements of the SSD. Therefore, in the development of the firmware of the SSD, it is necessary for developers to consider details of how to schedule the tasks and how to switch the tasks. Therefore, it is not a good solution to develop firmware that includes some functions of the operating system without an operating system.

SUMMARY

An object of the present disclosure is to provide a task scheduling method and apparatus, an electronic device and a non-transitory computer readable storage medium, which improve the task switching efficiency and meet the requirement of high concurrency of the SSD.

To achieve the above object, in some embodiments of the present disclosure, there is provided a task scheduling method, applied to an operating system of a solid state disk, including:
  creating a target task and creating a target process corresponding to the target task;
  selecting an idle target central processing unit (CPU) core for the target task and deploying the target process in the target CPU core;
  calling a process function in the target process using the target CPU core to execute the target task;
  in a process of executing the target task, calling a task switching function of the target task, where parameters of the task switching function include a dependent object during task switching and parameters corresponding to the dependent object; and
  selecting a switching task from all tasks waiting for switching and calling a process function corresponding to the switching task using the target CPU core to switch the target CPU core to the switching task for execution.

To achieve the above object, in some embodiments of the present disclosure, there is further provided an electronic device, including:
  a memory for storing a computer program; and
  a processor for executing the computer program to implement the steps of the above task scheduling method.

To achieve the above object, in some embodiments of the present disclosure, there is further provided a non-transitory computer readable storage medium storing a computer program, where the processor, when executing the computer program, implements the steps of the above task scheduling method.

As can be known from the above solution that in some embodiments of the present disclosure, there is provided the task scheduling method, including: creating the target task and creating the target process corresponding to the target task; selecting the idle target central processing unit (CPU) core for the target task and deploying the target process in the target CPU core; calling the process function in the target process using the target CPU core to execute the target task; in the process of executing the target task, calling the task switching function of the target task, where parameters of the task switching function include the dependent object during task switching and parameters corresponding to the dependent object; and selecting the switching task from all tasks waiting for switching and calling the process function corresponding to the switching task using the target CPU core to switch the target CPU core to the switching task for execution.

In some embodiments of the present disclosure, a task switching function is provided for users in the operating system, compared with that the task switching is performed in an interrupted manner in the related art, in some embodiments of the present disclosure, the efficiency of the task switching is improved and the requirement of high concurrency of the SSD is met. In some embodiments of the present disclosure, there is further discloses a task scheduling apparatus, an electronic device and a non-transitory computer readable storage medium, which also realize the above technical effects.

It should be understood that the above general description and the following detailed description are merely exemplary, and are not restrictive of the present disclosure.

BRIEF DESCRIPTION OF THE DRAWINGS

In order to more clearly illustrate technical solutions in embodiments of the present disclosure or in the related art, accompanying drawings to be used in the description of the embodiments or the related art will be briefly introduced below. Apparently, the accompanying drawings in the description below are only some embodiments of the present disclosure. For a person skilled in the art, other accompanying drawings may also be obtained according to these accompanying drawings without paying creative labor. The accompanying drawings are used for providing a further understanding of the present disclosure, constitute a part of the specification, illustrate the present disclosure together with the specific embodiments below, and are not intended to limit the present disclosure. In the drawings.

DETAILED DESCRIPTION

The technical solutions in the embodiments of the present disclosure will be clearly and completely described below with reference to the accompanying drawings. Obviously, the described embodiments are some, but not all, embodiments of the present disclosure. Based on the embodiments of the present disclosure, all other embodiments obtained by a person skilled in the art without creative labor are within the protection scope of the present disclosure. In addition, in embodiments of the present disclosure, "first", "second", and the like are used for distinguishing similar objects, and not necessarily used for describing a particular sequence or chronological order.

A solid state disk (SSD) has advantages of high performance and low power consumption, and is a device configured to store user data. The SSD consists of modules such as a controller and a storage medium NAND (an NAND flash memory, a computer flash memory device). Firmware runs in the controller to perform operations such as controlling resources, storing and scheduling the user data, and maintaining an NAND device.

The SSD provides extremely high concurrency, for example, 1.6 million reads and writes per second. These reads and writes are not completed sequentially, that is, not finishing one first and then processing the next one. If each task is executed sequentially, such high performance cannot be realized. Inside the SSD, these commands are executed concurrently, that is, one command has not been completed yet, while another command has already started executing. Generally speaking, under current technologies, thousands to tens of thousands of read/write operations can be performed at the same time.

Each command faces steps such as command message parsing, mapping table searching, NAND operation, error and exception handling, data transmission, and returning to a completed state. The steps of operation may not necessarily wholly the same due to different commands. There are thousands to tens of thousands of commands operating at the same time, the SSD does not have thousands to tens of thousands of computing units, and thus computing resources are used through scheduling.

Generally speaking, if it is necessary to operate a plurality of tasks at the same time, and the computing resources are limited, assuming that there are n central processing units (CPUs) and several memories, it is necessary for these n CPUs to perform task scheduling to serve the plurality of tasks, that is, a CPU will do task 1 for a while and task 2 for a while, that is, the CPU or a set of resources is multiplexed in a time division manner. When one of the plurality of tasks reaches the completed state, the resources are released, and it is possible to add a service for a new task.

Under the current related art, there is no special purpose operating system for the SSD. The operating system should at least provide functions such as task scheduling, resource management and system calls. A general operating system is not designed for such high concurrency. If each process in the operating system serves a task, there will be thousands of processes. Although the operating system can nominally have so many processes, the efficiency of the switching and scheduling of the processes in the scenario is very low, which cannot meet requirements of the SSD. Therefore, in the development of the firmware of the SSD, it is necessary for developers to consider details of how to schedule the tasks and how to switch the tasks, which brings following problems: an architecture of the firmware is only applicable to a hardware architecture, since the development process of the firmware has fully considered characteristics of hardware, these characteristics have been programmed into an internal structure of the firmware, if a structure of the hardware is changed, these characteristics will become obstacles to a new version of the firmware, and the architecture of the firmware needs to be redesigned. In addition, the development efficiency is low. The developers of the firmware not only need to consider functional logics of the firmware, but also develop some functions of the operating system, for example, the task scheduling and the resource management, it will have a negative impact on personal abilities and workloads of the developers of the firmware. Therefore, it is not a good solution to develop firmware that includes some functions of the operating system without an operating system.

In some embodiments of the present disclosure, there is disclosed a task scheduling method, which may improve the task switching efficiency and meet the requirement of high concurrency of the SSD.

Figure 1:
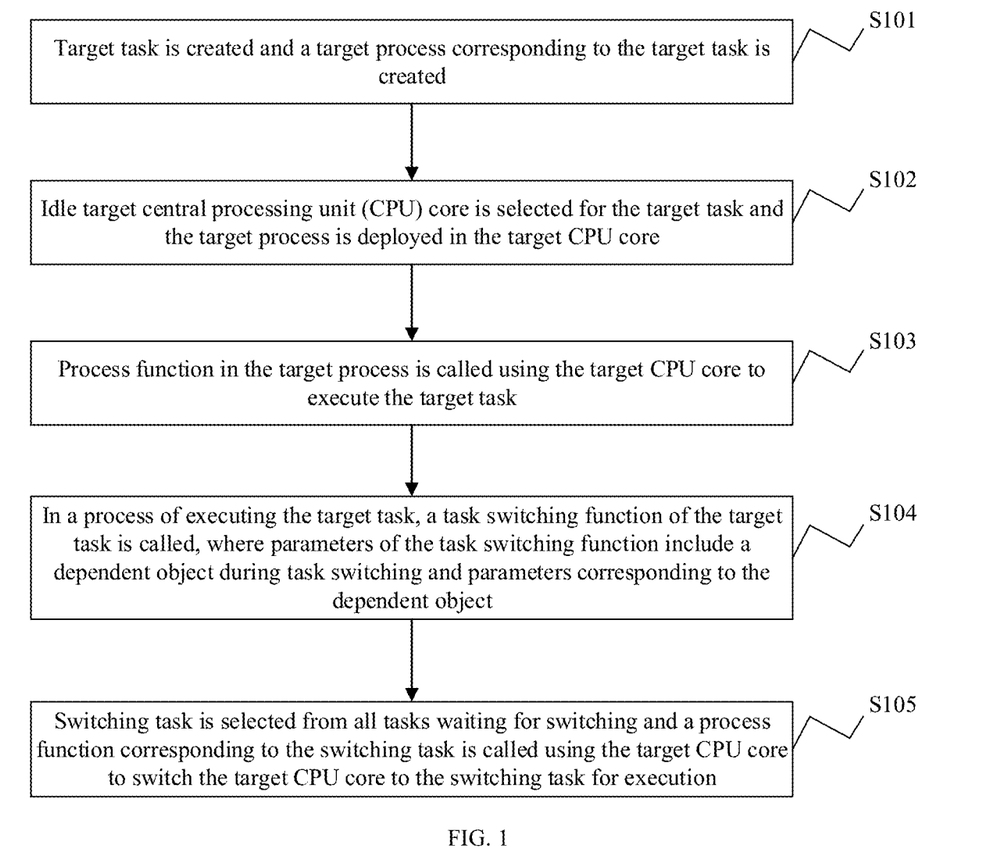
FIG. 1 is a flowchart of a task scheduling method provided in some embodiments of the present disclosure.

Referring to FIG. 1, FIG. 1 is a flowchart of a task scheduling method provided in some embodiments of the present disclosure. As shown in FIG. 1, the method includes following steps.

S101, a target task is created and a target process corresponding to the target task is created.

In some embodiments, a professional operating system SSD_OS is provided for solid state disks (SSDs), the operating system is exposed to interfaces CreateTask( ) for applications to create tasks, and developers will allocate a task for each read/write request. For the developers, all works in the task is called synchronously, and it is unnecessary for the developers to make the task into a callback function and wait for switching. The switching process is realized by the SSD_OS, and the developers do not need to be aware of the process. Besides read/write requests, other works can also be encapsulated into one task, for example, timer tasks and system management tasks.

Creating the target process corresponding to the target task includes: determining task parameters of the target task, where the task parameters at least include a function corresponding to the target task and parameters corresponding to the function; and creating the target process corresponding to the target task based on the task parameters of the target task, and allocating resources to the target process, where the resources include a task identifier, a stack space and a register address.

When creating a task, parameters related to the task are included. The parameters include at least function instances (that is, process functions) corresponding to the task and parameters related to functions. The task parameter of the task, for example, creating a read-related task, is to pass functions corresponding to the read task (developed by developers of firmware) to the CreateTask( ) Users can create a read task and pass a received Host read instruction message as a parameter to the task.

When calling the created task, the task can be executed immediately, or can be triggered by calling a task start function later. When internal resources of the SSD_OS are insufficient, the creation of the task can also fail, and applications of the firmware should try to apply for the task again after a period of time.

When an application calls the CreateTask, the SSD_OS internally allocates runtime resources are allocated to the task within the SSD_OS. The runtime resources include the following elements (referred to as task context, that is, context): a task identity (TaskID for short) and a stack space (Stack).

An underlying operating system is used to identify an identifier of the task. For a version of the SSD_OS, the TaskID can be a limited number. For example, in a version (V1.0) of the SSD_OS, only 1000 IDs can be supported, and in a version (V2.0) of the SSD_OS, 2000 IDs can be supported. Different versions of the SSD_OS are bound to hardware. If a certain SSD controller manufacturer has more hardware resources, there can be more Task IDs. There is a maximum number limit for the TaskID. When the SSD_OS is initialized, the number of all IDs is determined according to a version number, and the allocated IDs cannot be allocated again before recycling. If there is no TaskID to allocate, the creation of the task failed.

For the stack space, it is a memory space used to save relevant information of the task. For example, for a read task, the users need a temporary memory space to store command message (for example, a package of non-volatile memory express (NVMe) commands) of an upper computer and local variables (for example, a for loop, variables used for loop times) that the users need when performing algorithm or process operation. During initialization, the SSD_OS allocates a segment of memory space as the stack space (in a design of the SSD_OS, it does not matter whether it is double data rate (DDR) or static random access memory (SRAM), and the developers can select according to their own needs when deploying the SSD_OS).

In some embodiments, a stack space with a preset size is allocated to the target process. In hardware environments with relatively large memory, a large enough default space value can also be directly allocated to each task, thereby avoiding memory copying; and at the same time, the users are no longer allowed to explicitly check whether it is out of bounds, thereby reducing the number of system calls. For example, each task is allocated a stack with a fixed size, for example, 128K Bytes, if the SSD_OS is deployed again to support 2000 concurrent tasks, a stack of 256M Bytes is required.

In some embodiments, all stack spaces are divided into a plurality of subspaces with different sizes; and a smallest subspace larger than a size of a stack space required by the target process as a target subspace is allocated to the target process. When allocating a task, the SSD_OS allocates a stack space with a default length (the default length is set when deploying the SSD_OS) to the task. A stack space check function is provided in the SSD_OS, project developers explicitly call the stack space check function to check the available stack space. When checking, the developers pass in a required stack size size_to_use. When a remaining stack space is less than size_to_use, the SSD_OS will reallocate a larger memory space, transfer contents of the current stack of the users to a new space, and modify a stack pointer of a program at the same time to ensure that the program of the developers will not exceed the stack space. For example, the stack space is divided into various sizes such as 8K, 16K, 32K, 64K and 128K, and each size corresponds to a preset number, for example, 2000 for 8K, 1000 for 16K and 300 for 128K. When creating a task, it is allocated to the smallest stack space by default, and one is selected from a free list of the stack space to be allocated. When the firmware calls the stack space check function again, it is found that it is close to the top of the stack space, and thus a relatively large stack space is reallocated, the data is copied to the space, and it is run again after modifying the stack pointer.

When starting a task, it can be started at the time of the CreateTask or by calling another function. The SSD_OS allocates a stack space, parameters are copied to the stack space, a stack register address is configured, other registers (related to the hardware environments where the SSD_OS runs) corresponding to the environment are configured, and then the process function is called to execute, and thus starting the task is a synchronous process.

S102, an idle target central processing unit (CPU) core is selected for the target task and the target process is deployed in the target CPU core.

In some embodiments, if the system has a plurality of CPU cores, the SSD_OS will select an idle core to submit the task according to task scheduling policies. If all cores are busy, the SSD_OS will wait for a certain process function to release the CPU. Therefore, the process of starting the task is blocked, and it will continue to be executed only if it is successful.

S103, a process function in the target process is called using the target CPU core to execute the target task.

S104, in a process of executing the target task, a task switching function of the target task is called, where parameters of the task switching function include a dependent object during task switching and parameters corresponding to the dependent object.

S105, a switching task is selected from all tasks waiting for switching and a process function corresponding to the switching task is called using the target CPU core to switch the target CPU core to the switching task for execution.

In some embodiments, the SSD_OS does not involve an underlying task scheduler, and does not perform multi-task scheduling by dividing time slices, but realizes task switching through an innovative algorithm.

For convenience of description, for example, a structure of the firmware can be similar to the following form (pseudocode 1):
  void main( )
  {
  while(true)
    if there is a new request then:
  createTask(request_handler( ), request_param)
  end if
  end while
  }

Different from conventional operating systems, the SSD has limited internal computing resources, and thus the task switching is not performed in an interrupted manner. In general, when an event occurs (for example, a high priority task request, time slice interrupt, an input output (IO) request, and the like), the operating system will enter a process of determining the task switching, that is, the operating system will exit from the current task and select a new task to switch in. In some embodiments, considering that the SSD does not need such a flexible operating system, the developers will evaluate the time consumption of each time period themselves, and the software can explicitly switch the tasks, and thus another switching solution is selected.

After the process function starts to execute, business logics such as IO commands, management commands and background commands starts to be processed. Since there are a plurality of hardware acceleration units in the SSD system, the process function will request the plurality of hardware acceleration units to work after a certain step is performed. At this time, the process function can process another task without waiting for the hardware acceleration units to complete operations. Therefore, applications based on the SSD_OS require the users to actively call the task switching function (taskSwitch function) to perform the task switching.

The taskSwitch includes two sets of parameters: the dependent object and related information of the dependent object. For example, a task may want to sleep for 10 seconds when it is processed to a certain node, and thus the taskSwitch switches to other processes and expects a timer to generate a signal after 10 seconds to switch back. The parameter can be written as (Timer, 10 second). Alternatively, for example, a task may be configured with a direct memory access (DMA) task, which allows a DMA module to transmit data of 10M bytes (from an address A to an address B). After configuring a parameter related to the DMA (the DMA parameter is assumed to be called DMA parameter X), the task will wait for a completion of DMA transmission. At this time, the CPU can be released to calculate other tasks, and thus the parameter of the taskSwitch can be written as (DMA, (DMA parameter X, DMA transmission completed)).

After entering the task switching function, the SSD_OS will select a function to enter according to field conditions of all processes waiting for switching (Pending Tasks). It should be noted that a next CreateTask function is also one of the Pending Tasks. Since the next createTask function is a code that has not been executed yet, the scheduling algorithm will select a process of the next createTask after evaluating that the tasks that have started to be executed do not need to be called.

The taskSwitch is transparent to the developers, that is, it is unnecessary for the developers to care about how the tasks are switched, which is performed by the SSD_OS.

TaskSwitch algorithm: the createTask function will record a context of each task in the SSD_OS. After the taskSwitch, it is necessary to select a task from these contexts to resume the call. An original intention of calling the taskSwith by an initiator of the taskSwitch is to release CPU resources for other processes, and thus in the context of the process, a state of IDLE will be recorded, and the conditions for the task to be awakened (that is, the above two sets of parameters of the createTask) will be recorded. Therefore, after entering the taskSwitch, it is necessary to view whether conditions of all candidate tasks are met. If any one of the candidate tasks does not meet the wake-up condition, the program will continue to execute backward, and the following statements can be executed. If only one candidate task can be executed, the task is executed. If a plurality of tasks are awake, the plurality of tasks are selected according to the algorithm.

In some embodiments, selecting the switching task from all tasks waiting for switching includes: determining first priorities of all tasks waiting for switching according to attributes of all tasks waiting for switching; and selecting a task waiting for switching with a highest first priority as the switching task.

In some embodiments, scheduling is performed according to priorities of the tasks, and a first priority is set for each task according to the attributes of the tasks. In some embodiments, the attributes arranged in descending order according to the first priorities include any one or any combination of displayed task switching, host read, host write, a host management command, background read, background write, a background management command, metadata management, an algorithm and statistical information.

Displayed task switching: when a task actively switches to another task, a priority is the highest, and the priority is 1. Host read: a read command sent by a host with a priority of 2. Host write: a write command sent by the host, with a priority of 3. Host management command: a management command sent by the host, with a priority of 4. Background read: a read command generated by internal management of the firmware, for example, a read command for Garbage Collection, with a priority of 5. Background write: a write command generated by internal management of the firmware, with a priority of 6. Background management command: a calculation process generated by task scheduling in the firmware, for example, scheduled refresh of Block, with a priority of 7. Metadata management: saving operations of metadata, with a priority of 8. Algorithm: algorithmic operations carried out inside the firmware, for example, data structure sorting optimization, with a priority of 9. Statistical information: internal statistics are performed, and a priority is 0.

When there are a plurality of tasks in the same priority, the plurality of tasks are sorted according to dependent objects. That is, selecting the task waiting for switching with the highest first priority as the switching task includes: in response to a presence of a plurality of tasks waiting for switching with the highest first priority, determining second priorities of all tasks waiting for switching according to dependent objects of all tasks waiting for switching during the task switching; and selecting a task waiting for switching with a highest second priority as the switching task from the plurality of tasks waiting for switching with the highest first priority.

In some embodiments, the dependent objects arranged in descending order according to the second priorities include a completion message, a lock resource release, a computer flash memory device (NAND) read/write command, a command indicating that direct memory access (DMA) flows to a host side, a command indicating that DMA flows to a device side, a lock resource acquisition command, a timer and an algorithm module.

Completion message: a hardware module that sends a completion message to the host. As long as the module is called, the host will consider that the command is completed, and thus a priority of the module is the highest, and the priority is 1. Lock resource release: a process of releasing mutually exclusive resources, after which other tasks can obtain resources again, and thus a priority thereof is higher, and the priority is 2. NAND read/write command: commands related to NAND and Flash channels, with a priority of 3. Command indicating that DMA flows to the host side: data is sent to the host to help the command complete, and a priority is 4. Command indicating that DMA flows to the device side: a normal operation, with a priority of 5. Lock resource acquisition command: acquire lock resources, with a priority of 6. Timer: if the timer has reached a time, it will wake up. Since the firmware will not use the timer as a means of precise control on a critical path, a priority of the timer is relatively high, and the priority is 7. Algorithm module: encryption, compression and other algorithms, which are not commonly used and will be executed in the background, that is, they are not on the critical path and a priority thereof is 8. Other modules: a priority thereof is 9.

In some embodiments, the method further includes: in response to an end time of the timer of the target task exceeding a preset value, rising a second priority of the target task by a preset level. It should be noted that the timer module should wake up if it has reached a preset time. However, since the priority of the timer is relatively low, if a plurality of tasks need to be awakened at the same time, the priority of the timer is relatively low. Therefore, a weight of the timer is adjusted. If a certain task is scheduled and it is found that the timer has timed out, the priority of the timer will be appropriately rose. In some embodiments, the priority can be rose by one step for every 10% timeout.

In some embodiments, selecting the switching task from all tasks waiting for switching includes: determining times corresponding to dependent objects when all tasks waiting for switching are completed; and selecting a task waiting for switching with a longest time as the switching task.

In some embodiments, special purpose hardware or an independent CPU is used to monitor a completion time of a dependent condition of each task, and once the task is completed, a completion time of a dependent object is recorded immediately. When scheduling is required, an overtime time of each task is updated, and a task with the longest overtime time is selected for switching. This solution is relatively simple, but the calculation amount is relatively large. The main reason is that since there is no special purpose hardware in the system to record the completion time of the dependent object, an independent CPU is needed for this task. Therefore, the SSD_OS is more suitable for controllers with task scheduling hardware.

To sum up, if there is currently no task to enter, continue to execute the following code, generally speaking, creat-eTask or Idle.

Further, after calling the process function corresponding to the switching task using the target CPU core to switch the target CPU core to the switching task for execution, the method further includes: detecting whether a dependent object corresponding to the target task is completed, and in response to the dependent object corresponding to the target task being completed, taking the target task as a task waiting for switching.

In some embodiments, when switching out of a task, it is necessary to record its runtime information, mainly a program pointer (PC) of the CPU and an address of a stack space. The stack space is created at the time of createTask. If the stack space is insufficient, the firmware will explicitly reset a stack address. The PC will also be recorded in the Context. After switching out, the PC before switching is recorded. When switching back in the future, the PC will be assigned to the CPU again to resume the process.

On the basis of the above embodiments, in some embodiments, the method further includes: deleting context information of the target task and releasing a stack space of the target task when the target task is completed. In some embodiments, when a task is completed, it is necessary to notify the SSD_OS to delete its related information, that is, the context. For convenience of description, the function is called closeTask( ). When the firmware calls closeTask( ), the SSD_OS releases the context related to the task and the stack space of the task, and then call taskSwitch( ) once. The task schedule at this time will have no parameters as it will not be switched in.

It can be seen that in some embodiments of the present disclosure, task switching may be performed without developing a compiler. Secondly, there is proposed a priority strategy for the process switching. If a hardware module or an independent CPU may speed up the switching process, it is more practical, and may be used even without such an independent module.

In some embodiments, a task switching function is provided for users in the operating system, compared with that the task switching is performed in an interrupted manner in the related art, in some embodiments of the present disclosure, the efficiency of the task switching is improved and the requirement of high concurrency of the SSD is met.

On the basis of the above embodiments, in some embodiments, the method further includes: determining whether processes corresponding to the other tasks are deployed in the target CPU core when the target task needs to communicate with other tasks; in response to the processes corresponding to the other tasks being deployed in the target CPU core, performing a communication between the target task with the other tasks in a shared memory variable manner; and in response to the processes corresponding to the other tasks not being deployed in the target CPU core, performing the communication between the target task with the other tasks in a resource lock mutually exclusive manner.

When a task communicates with another task, there are two scenarios. If two tasks are on the same physical CPU, it is only necessary to share memory variables. In fact, these two tasks occupy the CPU in different periods and will not really seize resources. If the two tasks are not on the same CPU, it is necessary to call a mutually exclusive manner provided by a hardware system for data protection.

On the basis of the above embodiments, in some embodiments, the process function includes a resource encapsulation function, where the resource encapsulation function includes any one or any combination of an input/output command selection function, a data transmission function, a resource locking function, a NAND operation function and a function sending a completion message to a host.

As an operating system, in addition to providing the process scheduling, it is also necessary to encapsulate the hardware in the system to be friendly to software development, so that the same software has relatively little change in different hardware environments. In some embodiments, the following encapsulation interfaces are defined, which may avoid directly operating hardware when calling, and only need to call system functions.

IO command selection: selectIO( ), when the host sends an IO request (including read/write/Trim, and the like) to the SSD device, the host encapsulates commands into a register message and sends the message to the SSD. The firmware of the SSD perceives the message and selects an IO command. Different controller hardware may perceive messages and select messages in different ways, and thus the SSD_OS encapsulates the operation, so that different hardware can use a unified interface. In an implementation, the hardware will put all IO requests into a register pool, and selectIO( ) will select the IO requests in the pool according to a round-robin manner. When there is no IO command, the command is completed immediately with a return message indicating that there is no new IO request at this time. If there is an IO command, return the IO command to the firmware.

DMA data transmission: DMA( ), with two parameters src and dst, which represent an output address and an input address of the DMA, respectively. Data transmission is a common internal operation of the SSD. Common transmission addresses include host and local memory. The memory is divided into a high-speed memory (for example, the SRAM) and a low-speed memory (for example, the DDR), and there may be persistent memory (for example, magnetic random access memory (MRAM), pulse code modulation (PCM), and the like). Transmission between different addresses represents different meanings. For example, transferring the local memory to the host represents that the user needs to read the data in the SSD and the data is transmitted to the host. Transferring a local high-speed memory to a low-speed memory may represent cache management and internal data optimization. Encapsulation is performed according to the commonality.

Resource Locking: Lock( ), with one parameter, a lock resource number. After calling the function, a lock will be applied and the task switching will be performed, and the current process will not be switched back until the lock resource is obtained. In a system with a plurality of instances, there will inevitably be resource competition risks, and thus a lock is needed. Hardware may support a plurality of physical locks, and in such hardware systems, these locks can be encapsulated. Some hardware systems support a limited number of physical locks. In such systems, it is necessary to use a lock resource for overall mutually exclusive, and then access independent resources, and thus a plurality of resources can also be locked.

NAND operation includes the following contents.

Initialize NAND: initNand( ).

Read NAND: readNAND( ), with two sets of parameters, a NAND address and read-related parameters including a read capacity and a location where the read data is transferred.

Write NAND: writeNAND( ), the same as above, with two sets of parameters, a NAND address and write parameters.

Erase NAND: eraseNAND( ), with a set of parameters, a NAND address.

Send a completion message to the host: sendCpl( ), when the data is transmitted to the host and there is no error in the transmission process, a completion message can be sent to the host. This process is generally implemented by operating the hardware and can be encapsulated. The specific operation will depend on the hardware system deployed by the SSD_OS. On a controller, it is realized by configuring registers for the hardware, and then filling, by the hardware, specific messages into a completion message queue of the host.

On the basis of the above embodiments, in some embodiments, the process function includes a system call function, where the system call function includes any one or any combination of a memory request function, a memory release function, an encryption algorithm function, a compression algorithm function, a redundant array of independent disk (RAID) operation function, a memory search function, a memory sorting function and a management interface input/output function.

In the implementation of SSDs, there are generally some general calculations or general processing procedures. For example, some algorithms are used by all SSDs, and thus the SSD_OS can encapsulate these algorithms into system calls to save development workloads for the developers to realize this process again.

Apply for and release a memory: memAlloc( ) and memFree( ), apply for a memory from system resources, with two parameters, a type of the memory (a high-speed memory, a low-speed memory, a non-volatile memory) and a size of the memory. A return value is an address of the memory. If it fails, return a special value, for example, −1.

Encryption/compression algorithm: encrypt( ) and compress( ), some hardware provides encryption/compression modules, if the hardware does not provide the encryption/compression modules, the encryption/compression modules can be realized by software. Considering that different SSDs have different application requirements, and some users of the SSD_OS may not need compression/encryption requirements, and thus this part can be tailored when the SSD_OS is deployed. There are two parameters, a Src memory address and a DST memory address. For encryption functions, encryption algorithms including parameters of secret keys will also be provided.

RAID operations: RAID5( ) and RAID6( ), enterprise SSDs generally have RAID functions. The RAID operations are encapsulated with two sets of parameters, a Src address and a DST address. Since RAID performs bit calculations on a plurality of addresses to generate check values, the Src address may be a plurality of different addresses, that is, a number of parameters can be changed. The DST address is an output address for RAID5 operations and two output addresses for RAID6 (there are two different bit algorithms that generate two sets of check data).

Search the memory: searchInRam( ), a certain data pattern is searched in the memory, and the function will be used when calculating with some algorithms. There are two sets of parameters: a range of address search (including a starting address and a length and a granularity of variables) and the searched pattern (including a mask and a comparison value). For example, there can be the following search behavior, searchInRam((0x01000000, 0x1000, 4), (0xFFF0000, 0x1234)), which means that the memory address starts from 0x100000000, the search length is 0x1000, and each memory is searched according to four bytes. In the memory, exclusive OR (XOR) the data of each address to 0xFFF0000, if an XOR result is 0x1234, the address will be returned as the search result.

Sort the memory: sortInRam( ), a certain memory area is sorted, and the function will be used when calculating with some algorithms. There are two sets of parameters: an address range of sorting (including a starting address and a length and a granularity of variable fields) and a comparison method of sorting (greater than or less than). After calling the function, areas of the memory are sorted in ascending order (if the parameter of sorting method is less than), and the sorted result overwrites the original memory address.

I/O functions of a management interface: uart_input( ), uart_output( ), spi_input( ) and spi_output( ), there are some sensors in the SSD, which generally interact with each other through the management interface, for example, a serial peripheral interface (SPI). In the development process, the developers often communicate with the Firmware through low-speed serial ports. There is a set of parameters, that is, input or output contents. Of course, the initialization operation of the management interface will also be included at the same time, which will not be further elaborated.

The SSD_OS will also provide a unified user interface, serviceRoutine( ), through which the developers can query or inject commands. The function is used during the development process and turned off when products are released. In some embodiments, the implementation method can be to provide a special system function in the system to realize the role of the attendance process. After the function is enabled, it waits to accept a uart_input instruction. In an input instruction, an instruction word and instruction parameters of the operation are encapsulated. The instruction word can includ the following contents.

View the memory: instruction word: viewRam, instruction parameters: a memory address and a length. After receiving the command, the attendance process will fetch contents of an address corresponding to the command and send the contents to the developers through uart_output.

Inject commands: instruction word: insertRoutine, instruction parameters: a task name. After receiving the command, the attendance process returns to create a new process using createTask( ). The contents of the process are the task name passed in.

Figure 2:
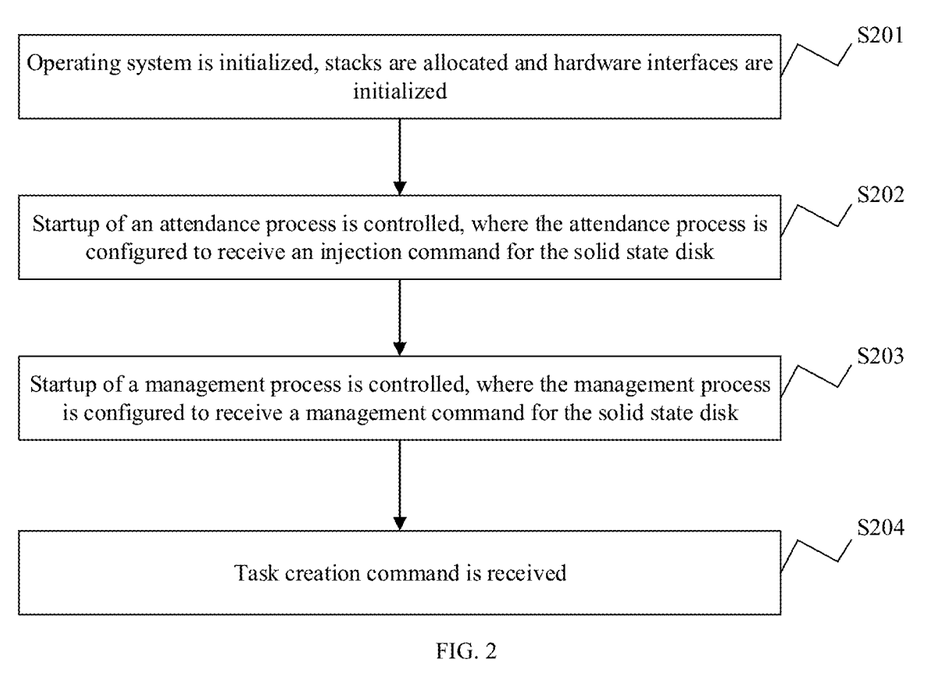
FIG. 2 is a flowchart of another task scheduling method provided in some embodiments of the present disclosure.

In some embodiments of the present disclosure, there is further disclosed a firmware design based on an SSD operating system. As shown in FIG. 2, FIG. 2 is a flowchart of another task scheduling method provided in some embodiments of the present disclosure. As shown in FIG. 2, the method includes:

S201, the operating system is initialized, stacks are allocated and hardware interfaces are initialized;

S202, a startup of an attendance process is controlled, where the attendance process is configured to receive an injection command for the solid state disk;

S203, a startup of a management process is controlled, where the management process is configured to receive a management command for the solid state disk; and S204, a task creation command is received.

In some embodiments, after the system is powered on, SSD_OS initialization, stack allocation and hardware interface initialization are performed, which are transparent to developers of firmware of an SSD, and the developers do not need to know the process of the software. The firmware of the SSD opens the attendance process, which is the user interface mentioned above. The firmware of the SSD opens a process for processing the management commands, where each management command opens a process. The firmware of the SSD enters a while loop and receives each IO command, where each IO command corresponds to a process.

To sum up, it can be represented as follows (pseudocode 2):

```
void main( )
{
createTask(serviceRoutine, serviceParam) //Service routine
createTask(formatRoutine, formatParam) //Service routine for format management command
createTask(smartInfoRoutine, smartInfoParam) //Service routine for obtaining SMART information
createTask(createIOQ, serviceParam) //Management command service routine for creating IO Queue
while(true)
   if there is a new request then:
createTask(requestHandler( ), request_param)
   end if
end while
}
```

It is necessary to describe an internal implementation of requestHandler: the requestHandler is responsible for processing IO commands. In an implementation, an IO may be read, write, Trim or other IO commands. Here, read and write are described to prove how to implement the firmware on the SSD_OS.

```
while true:
oneIO=selectIO( ) //Obtain an IO request, and if not, return False
if oneIO is None:
   taskSwitch( ) //There is no IO at present, schedule to other tasks first
elif oneIO is Read:
   readRoutine(oneIO) //If it is a read command, perform a read service routine
elif oneIO is Write:
   writeRoutine(oneIO) //If it is a write command, perform a write service routine else:
   doOtherRoutine( ) //Other tasks are not covered in the description
endif
```

For the read service routine, it can be designed as follows:

```
def readRoutine(oneIO):
Lock(OneIO. LBA, OneIO. Length) //Lock the LBA and the address of the current read command. The taskSwitch( ) will be automatically called in the lock function, and will not return to this line of functions until the lock is obtained
PBA=lookupTable(oneIO. LBA) //According to the LBA address, look up the table to obtain the physical address, which is called PBA for short. This function needs to be realized by the users themselves and is not a routine encapsulated in the OS
buffer=memAlloc( ) //Before reading data from NAND, apply for a memory address to store the data
readNand((PBA), (buffer)) //Read the data
DMA(buffer, OneIO. hostAddr) //Send the read data to the host
sendCpl(OneIO) //Complete the message
unLock(OneIO. LBA, OneIO. Length) //Release the lock on resources
memFree(buffer)
closeTask( ) //Close the process
```

For the write service routine, it can be designed as follows:

```
def writeRoutine(oneIO):
Lock(OneIO. LBA, OneIO. Length) //Lock the LBA and the address of the current write command. The taskSwitch( ) will be automatically called in the lock function, and will not return to this line of functions until the lock is obtained
Buffer=memAlloc( ) //Before writing data to NAND, apply for a memory address to store the data
DMA(OneIO. hostAddr, buffer) //Store the data from the host side into the buffer
PBA=AllocNANDAddr (oneIO. LBA) //Select a free address to store the data according to an internal data structure and address allocation logics of the firmware. These are logics that the developers of the firmware need to implement themselves, and will not be described here
writeNand((PBA), (buffer)) //Read the data
sendCpl(OneIO) //Complete the message
unLock(OneIO. LBA, OneIO. Length) //Release the lock on resources
memFree(buffer) //Releases the buffer applied previously
closeTask( ) //Close the process
```

The above is an example of an implementation method of a read/write critical path, which is used to illustrate that the developers of the firmware can completely use synchronization processes to develop on the SSD_OS, without considering the process switching and defining the state machine themselves, thereby greatly reducing the complexity of the development.

It can be seen that in some embodiments of the present disclosure, there is proposed a special purpose operating system for the SSD. On the basis of the operating system, developers of the firmware only need to consider business logics, and do not need to care about the process switching and underlying information of resources, which is convenient for the developers to develop the firmware, thereby reducing the development complexity of the developers, reducing development costs and expenses, and improving the development efficiency. At the same time, the operating system can also adapt to different hardware architectures, so that a set of firmware can adapt to hardware of different manufacturers. In some embodiments, reference can be provided for hardware design, so that hardware and software can cooperate more effectively. If the hardware can provide a high-performance process scheduler, the hardware can effectively interface with the SSD_OS and provide the higher SSD performance.

A task scheduling apparatus provided in the some embodiments of the present disclosure is described below. The task scheduling apparatus described below and the task scheduling method described above can be mutually referenced.

Figure 3:
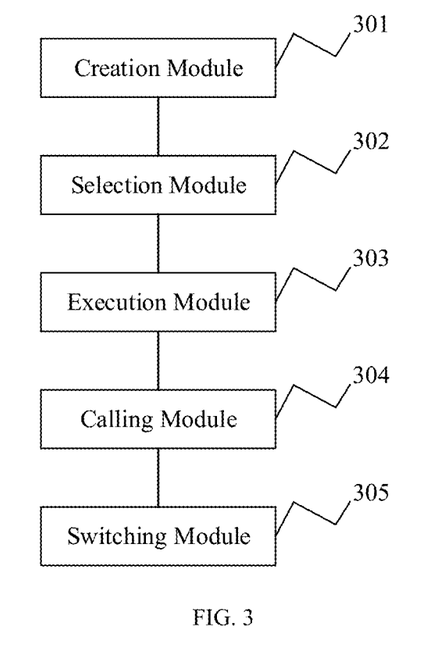
FIG. 3 is a structural diagram of a task scheduling apparatus provided in some embodiments of the present disclosure.

Referring to FIG. 3, FIG. 3 is a structural diagram of a task scheduling apparatus provided in some embodiments of the present disclosure. As shown in FIG. 3, the apparatus includes:
- a creation module 301 configured to create a target task and create a target process corresponding to the target task;
- a selection module 302 configured to select an idle target central processing unit (CPU) core for the target task and deploy the target process in the target CPU core;
- an execution module 303 configured to call a process function in the target process using the target CPU core to execute the target task;
- a calling module 304 configured to in a process of executing the target task, call a task switching function of the target task, where parameters of the task switching function include a dependent object during task switching and parameters corresponding to the dependent object; and
- a switching module 305 configured to select a switching task from all tasks waiting for switching and call a process function corresponding to the switching task using the target CPU core to switch the target CPU core to the switching task for execution.

In some embodiments of the present disclosure, a task switching function is provided for users in the operating system, compared with that the task switching is performed in an interrupted manner in the related art, in some embodiments of the present disclosure, the efficiency of the task switching is improved and the requirement of high concurrency of the SSD is met.

On the basis of the above embodiments, in some embodiments, the creation module 301 includes:
- a first determining unit configured to determine task parameters of the target task, where the task parameters at least include a function corresponding to the target task and parameters corresponding to the function;
- a creation unit configured to create the target process corresponding to the target task based on the task parameters of the target task;
- an allocation unit configured to allocate resources to the target process, where the resources include a task identifier, a stack space and a register address.

On the basis of the above embodiments, in some embodiments, the allocation unit is configured to allocate a stack space with a preset size to the target process.

On the basis of the above embodiments, in some embodiments, the allocation unit is configured to divide all stack spaces into a plurality of subspaces with different sizes; and allocate a smallest subspace larger than a size of a stack space required by the target process as a target subspace to the target process.

On the basis of the above embodiments, in some embodiments, the apparatus further includes:
- a detection module configured to detect whether a dependent object corresponding to the target task is completed, and in response to the dependent object corresponding to the target task being completed, taking the target task as a task waiting for switching.

On the basis of the above embodiments, in some embodiments, the switching module 305 includes:
- a second determining unit configured to determine first priorities of all tasks waiting for switching according to attributes of all tasks waiting for switching;
- a selection unit configured to select a task waiting for switching with a highest first priority as the switching task; and
- a switching unit configured to call the process function corresponding to the switching task using the target CPU core to switch the target CPU core to the switching task for execution.

On the basis of the above embodiments, in some embodiments, the attributes arranged in descending order according to the first priorities include any one or any combination of displayed task switching, host read, host write, a host management command, background read, background write, a background management command, metadata management, an algorithm and statistical information.

On the basis of the above embodiments, in some embodiments, the selection unit is configured to in response to a presence of a plurality of tasks waiting for switching with the highest first priority, determine second priorities of all tasks waiting for switching according to dependent objects of all tasks waiting for switching during the task switching; and select a task waiting for switching with a highest second priority as the switching task from the plurality of tasks waiting for switching with the highest first priority.

On the basis of the above embodiments, in some embodiments, the dependent objects arranged in descending order according to the second priorities include a completion message, a lock resource release, a computer flash memory device (NAND) read/write command, a command indicating that direct memory access (DMA) flows to a host side, a command indicating that DMA flows to a device side, a lock resource acquisition command, a timer and an algorithm module.

On the basis of the above embodiments, in some embodiments, the apparatus further includes:
- a rising module configured to in response to an end time of the timer of the target task exceeding a preset value, rise a second priority of the target task by a preset level.

On the basis of the above embodiments, in some embodiments, the switching module 305 is configured to determine times corresponding to dependent objects when all tasks waiting for switching are completed; select a task waiting for switching with a longest time as the switching task; and call the process function corresponding to the switching task using the target CPU core to switch the target CPU core to the switching task for execution.

On the basis of the above embodiments, in some embodiments, the apparatus further includes:

a communication module configured to determine whether processes corresponding to the other tasks are deployed in the target CPU core when the target task needs to communicate with other tasks; in response to the processes corresponding to the other tasks being deployed in the target CPU core, perform a communication between the target task with the other tasks in a shared memory variable manner; and in response to the processes corresponding to the other tasks not being deployed in the target CPU core, perform the communication between the target task with the other tasks in a resource lock mutually exclusive manner.

On the basis of the above embodiments, in some embodiments, the apparatus further includes:

a deletion module configured to delete context information of the target task and releasing a stack space of the target task when the target task is completed.

On the basis of the above embodiments, in some embodiments, the process function includes a resource encapsulation function, where the resource encapsulation function includes any one or any combination of an input/output command selection function, a data transmission function, a resource locking function, a NAND operation function and a function sending a completion message to a host.

On the basis of the above embodiments, in some embodiments, the process function includes a system call function, where the system call function includes any one or any combination of a memory request function, a memory release function, an encryption algorithm function, a compression algorithm function, a redundant array of independent disk (RAID) operation function, a memory search function, a memory sorting function and a management interface input/output function.

On the basis of the above embodiments, in some embodiments, the apparatus further includes:

an initialization module configured to initialize the operating system, allocating stacks, and initializing hardware interfaces;

a first control module configured to control a startup of an attendance process, where the attendance process is configured to receive an injection command for the solid state disk;

a second control module configured to control a startup of a management process, where the management process is configured to receive a management command for the solid state disk; and a receiving module configured to receive a task creation command.

With respect to the apparatus in the above embodiments, the manner in which each module performs operations has been described in detail in the embodiments of the method, and will not be described in detail here.

Figure 4:
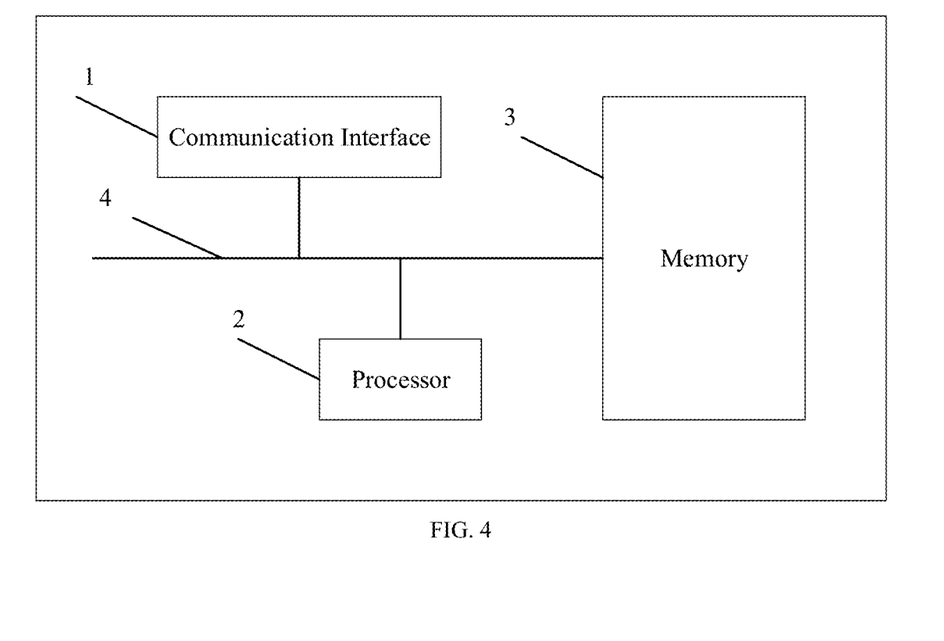
FIG. 4 is a structural diagram of an electronic device provided in some embodiments of the present disclosure.

Based on the hardware implementation of the above program module, and in order to implement the above method, in some embodiments of the present disclosure, there is further provided an electronic device. FIG. 4 is a structural diagram of an electronic device provided in some embodiments of the present disclosure. As shown in FIG. 4, the electronic device includes:

a communication interface 1 capable of performing information interaction with other devices such as network devices; and a processor 2 which is connected to the communication interface 1 to realize information interaction with other devices, and executes the task scheduling method provided by one or more technical solutions described above when being used to run a computer program, while the computer program is stored on a memory 3.

Certainly, in an actual application, various components in the electronic device are coupled together through a bus system 4. It is understood that the bus system 4 is configured to realize connection communication among these components. The bus system 4 includes a power bus, a control bus and a state signal bus, in addition to a data bus. However, for clarity of illustration, various buses are labeled as the bus system 4 in FIG. 4.

The memory 3 in the embodiments of the present disclosure is configured to store various types of data to support the operation of the electronic device. Examples of such data include: any computer program for operating on the electronic device.

It is understood that the memory 3 may be either a volatile memory or a non-volatile memory, and may include both the volatile memory and the non-volatile memory, where the non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc, or a compact disc read-only memory (CD-ROM); and the magnetic surface memory may be a magnetic disc memory or a magnetic tape memory. The volatile memory may be a random access memory (RAM), which serves as an external cache. By way of illustrative but not limiting description, many forms of RAMs are available, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The memory 2 described in some embodiments of the present disclosure is intended to include, without being limited to, these and any other suitable types of memories.

The method disclosed in some embodiments of the present disclosure described above may be applied in or implemented by the processor 2. The processor 2 may be an integrated circuit having signal processing capability. In the implementation process, the operations of the above method may be performed by an integrated logic circuit of hardware or instructions in the form of software in the processor 2. The above processor 2 may be a general-purpose processor, a digital signal processor (DSP), or other programmable logic devices, a discrete gate or transistor logic device, a discrete hardware component and the like. The processor 2 may implement or execute the various methods, steps, and logic block diagrams disclosed in some embodiments of the present disclosure. The general-purpose processor may be a microprocessor, or any conventional processor and the like. The operations of the method disclosed in combination with the embodiments of the present disclosure may be directly embodied as being executed and completed by a hardware decoding processor, or being executed and completed by the combination of hardware and software modules in a decoding processor. The software module may be located in a storage medium which is located in the memory 3, and the processor 2 reads a program in the memory 3 to perform the steps of the method described above in combination with hardware of the processor 2.

The processor 2, when executing the program, implements the corresponding flows in the various methods of the embodiments of the present disclosure, and for the sake of brevity, it will not be described in detail herein.

Figure 5:
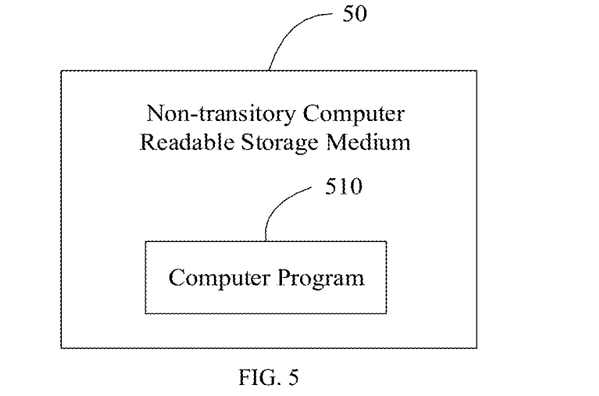
FIG. 5 is a structural diagram of a non-transitory computer readable storage medium provided in some embodiments of the present disclosure.

In some embodiments of the present disclosure, there is further provides a non-transitory computer readable storage medium. As shown in FIG. 5, the non-transitory computer readable storage medium 50 stores a computer program 510, where the processor, when executing the computer program 510, implements the steps of the above task scheduling method.

A person skilled in the art will appreciate that all or some of the steps for implementing the embodiments of the above method may be performed by hardware associated with program instructions, and the above program may be stored in a computer readable storage medium, and the program, when being executed, performs the steps including the embodiments of the above method; while the above storage medium includes: various media which may store program codes such as a mobile storage device, an ROM, an RAM, a diskette, a compact disc, or the like.

Alternatively, when the above integrated unit of the present disclosure is implemented in the form of a software functional module and sold or used as an independent product, the integrated unit may also be stored in a computer readable storage medium. Based on such an understanding, the technical solutions of the embodiments of the present disclosure, in essence or in part contributing to the prior art, may be embodied in the form of a software product, and the computer software product is stored in a storage medium including instructions for causing an electronic device (which may be a personal computer, a server, or a network device and the like) to perform all or some of the methods described in various embodiments of the present disclosure, while the above storage medium includes: various media which may store program codes such as the mobile storage device, the ROM, the RAM, the diskette, or the compact disc and the like.

Although only the specific embodiments of the present disclosure have been described above, the protection scope of the present disclosure is not limited thereto, any person skilled in the art would readily conceive changes or substitutions within the technical scope disclosed by the present disclosure, and all the changes or substitutions should fall within the protection scope of the present disclosure. Therefore, the protection scope of the present disclosure should be as set forth in the claims.

The invention claimed is:

1. A task scheduling method, applied to an operating system of a solid state disk, comprising:
    creating a target task and creating a target process corresponding to the target task;
    selecting an idle target central processing unit (CPU) core for the target task and deploying the target process in the target CPU core;
    calling a process function in the target process using the target CPU core to execute the target task;
    in a process of executing the target task, calling a task switching function of the target task, wherein parameters of the task switching function comprise a dependent object during task switching and parameters corresponding to the dependent object; and
    selecting a switching task from all tasks waiting for switching and calling a process function corresponding to the switching task using the target CPU core to switch the target CPU core to the switching task for execution,
    wherein the method further comprises:
    in response to a presence of a plurality of tasks waiting for switching with the highest first priority, determining second priorities of all tasks waiting for switching according to dependent objects of all tasks waiting for switching during the task switching; and
    selecting a task waiting for switching with a highest second priority as the switching task from the plurality of tasks waiting for switching with the highest first priority,
    wherein the dependent objects arranged in descending order according to the second priorities comprise a completion message, a lock resource release, a computer flash memory device (NAND) read/write command, a command indicating that direct memory access (DMA) flows to a host side, a command indicating that DMA flows to a device side, a lock resource acquisition command, a timer and an algorithm module.

2. The task scheduling method according to claim 1, wherein creating the target process corresponding to the target task comprises:
    determining task parameters of the target task, wherein the task parameters at least comprise a function corresponding to the target task and parameters corresponding to the function; and
    creating the target process corresponding to the target task based on the task parameters of the target task, and allocating resources to the target process, wherein the resources comprise a task identifier, a stack space and a register address.

3. The task scheduling method according to claim 2, wherein allocating the resources to the target process comprises:
    allocating a stack space with a preset size to the target process.

4. The task scheduling method according to claim 2, wherein allocating the resources to the target process comprises:
    dividing all stack spaces into a plurality of subspaces with different sizes; and
    allocating a smallest subspace larger than a size of a stack space required by the target process as a target subspace to the target process.

5. The task scheduling method according to claim 2, further comprising:
    in response to no task identifier being allocated, determining that creating the target task failed.

6. The task scheduling method according to claim 1, wherein after calling the process function corresponding to the switching task using the target CPU core to switch the target CPU core to the switching task for execution, the method further comprises:
    detecting whether a dependent object corresponding to the target task is completed, and in response to the dependent object corresponding to the target task being completed, taking the target task as a task waiting for switching.

7. The task scheduling method according to claim 1, wherein selecting the switching task from all tasks waiting for switching comprises:

determining first priorities of all tasks waiting for switching according to attributes of all tasks waiting for switching; and selecting a task waiting for switching with a highest first priority as the switching task.

8. The task scheduling method according to claim 7, wherein the attributes arranged in descending order according to the first priorities comprise any one or any combination of displayed task switching, host read, host write, a host management command, background read, background write, a background management command, metadata management, an algorithm and statistical information.

9. The task scheduling method according to claim 1, further comprising:

in response to an end time of the timer of the target task exceeding a preset value, rising a second priority of the target task by a preset level.

10. The task scheduling method according to claim 1, wherein selecting the switching task from all tasks waiting for switching comprises:

determining times corresponding to dependent objects when all tasks waiting for switching are completed; and selecting a task waiting for switching with a longest time as the switching task.

11. The task scheduling method according to claim 1, further comprising:

determining whether processes corresponding to the other tasks are deployed in the target CPU core when the target task needs to communicate with other tasks; and in response to the processes corresponding to the other tasks being deployed in the target CPU core, performing a communication between the target task with the other tasks in a shared memory variable manner.

12. The task scheduling method according to claim 11, wherein after determining whether the processes corresponding to the other tasks are deployed in the target CPU core, the method further comprises:

in response to the processes corresponding to the other tasks being deployed in other CPU cores, performing the communication between the target task with the other tasks in a resource lock mutually exclusive manner.

13. The task scheduling method according to claim 1, further comprising:

deleting context information of the target task and releasing a stack space of the target task when the target task is completed.

14. The task scheduling method according to claim 1, wherein the process function comprises a resource encapsulation function, wherein the resource encapsulation function comprises any one or any combination of an input/output command selection function, a data transmission function, a resource locking function, a NAND operation function and a function sending a completion message to a host.

15. The task scheduling method according to claim 1, wherein the process function comprises a system call function, wherein the system call function comprises any one or any combination of a memory request function, a memory release function, an encryption algorithm function, a compression algorithm function, a redundant array of independent disk (RAID) operation function, a memory search function, a memory sorting function and a management interface input/output function.

16. The task scheduling method according to claim 1, further comprising:

initializing the operating system, allocating stacks and initializing hardware interfaces;

controlling a startup of an attendance process, wherein the attendance process is configured to receive an injection command for the solid state disk;

controlling a startup of a management process, wherein the management process is configured to receive a management command for the solid state disk; and receiving a task creation command.

17. An electronic device, comprising:

a memory for storing a computer program; and a processor for executing the computer program to implement operations comprising:

creating a target task and creating a target process corresponding to the target task;

selecting an idle target central processing unit (CPU) core for the target task and deploying the target process in the target CPU core;

calling a process function in the target process using the target CPU core to execute the target task;

in a process of executing the target task, calling a task switching function of the target task, wherein parameters of the task switching function comprise a dependent object during task switching and parameters corresponding to the dependent object; and selecting a switching task from all tasks waiting for switching and calling a process function corresponding to the switching task using the target CPU core to switch the target CPU core to the switching task for execution, wherein the operations further comprise:

in response to a presence of a plurality of tasks waiting for switching with the highest first priority, determining second priorities of all tasks waiting for switching according to dependent objects of all tasks waiting for switching during the task switching; and selecting a task waiting for switching with a highest second priority as the switching task from the plurality of tasks waiting for switching with the highest first priority, wherein the dependent objects arranged in descending order according to the second priorities comprise a completion message, a lock resource release, a computer flash memory device (NAND) read/write command, a command indicating that direct memory access (DMA) flows to a host side, a command indicating that DMA flows to a device side, a lock resource acquisition command, a timer and an algorithm module.

18. A non-transitory computer readable storage medium storing a computer program, wherein the processor, when executing the computer program, implements operations comprising:

creating a target task and creating a target process corresponding to the target task;

selecting an idle target central processing unit (CPU) core for the target task and deploying the target process in the target CPU core;

calling a process function in the target process using the target CPU core to execute the target task;

in a process of executing the target task, calling a task switching function of the target task, wherein parameters of the task switching function comprise a dependent object during task switching and parameters corresponding to the dependent object; and selecting a switching task from all tasks waiting for switching and calling a process function corresponding to the switching task using the target CPU core to switch the target CPU core to the switching task for execution, wherein the operations further comprise:

in response to a presence of a plurality of tasks waiting for switching with the highest first priority, determining second priorities of all tasks waiting for switching according to dependent objects of all tasks waiting for switching during the task switching; and selecting a task waiting for switching with a highest second priority as the switching task from the plurality of tasks waiting for switching with the highest first priority, wherein the dependent objects arranged in descending order according to the second priorities comprise a completion message, a lock resource release, a computer flash memory device (NAND) read/write command, a command indicating that direct memory access (DMA) flows to a host side, a command indicating that DMA flows to a device side, a lock resource acquisition command, a timer and an algorithm module.

\* \* \* \* \*